Oct. 27, 1936.                    C. G. SUITS                    2,059,057
                         DIFFERENTIAL TIME DELAY SYSTEM
                              Filed Jan. 22, 1936
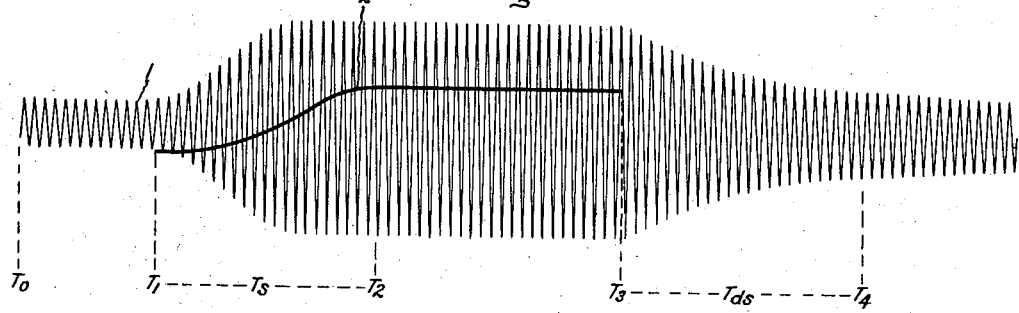
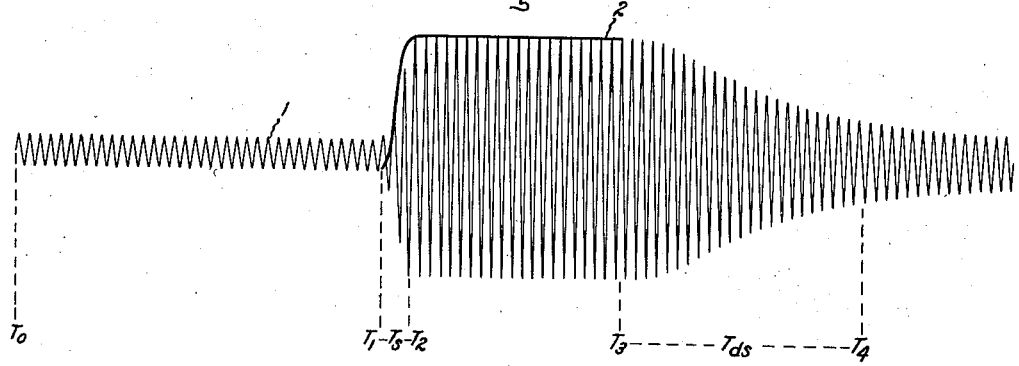
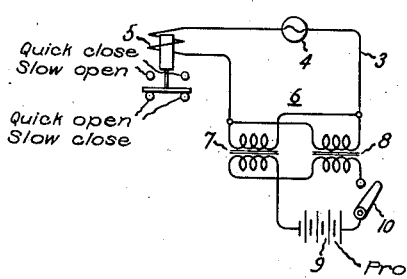
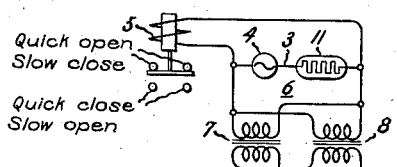
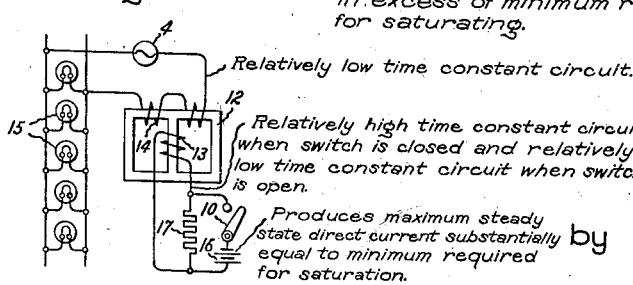
Inventor:
Chauncey G. Suits,
by Harry E. Dunham
His Attorney.

Patented Oct. 27, 1936

2,059,057

UNITED STATES PATENT OFFICE 2,059,057

DIFFERENTIAL TIME DELAY SYSTEM

Chauncey G. Suits, Schenectady, N. Y., assignor to General Electric Company, a corporation of New York Application January 22, 1936, Serial No. 60,275

11 Claims. (Cl. 171—97)

My invention relates to differential time delay systems, and more particularly to systems of this type which are controlled by a saturable core reactor.

By differential time delay I mean a time delay which is unequal for both directions of operation of a device. For example, in the control of many kinds of electro-responsive devices, such for example as electro-magnetic relays or electric lamps, it may be desirable that a time delay be introduced in their energization while there is little or no time delay in their deenergization or it may be desirable to introduce a time delay in their deenergization and have little or no time delay in their energization.

By saturable core reactor I mean a core or cores of magnetically saturable material, such for example as iron, on which is wound one or more alternating current windings and one or more direct current saturating windings. By varying the amount of current in the direct current winding the magnetic reluctance of the core is varied and this in turn varies the current limiting reactance value of the alternating current winding. Consequently a saturable core reactor may be looked upon as a kind of alternating current rheostat in which the current limiting ability is controlled by the amount of direct current in the direct current saturating winding. The alternating current winding may therefore be connected as a control device in an alternating current circuit in a manner analogous to the way an ordinary rheostat is connected as a control device in any kind of circuit.

In accordance with one feature of my invention I secure a differential time delay control with a saturable core reactor by selectively substantially instantaneously applying to and removing from the saturating winding of the reactor a direct potential sufficiently high to produce a final steady state direct current in the saturating winding which substantially exceeds the minimum requirements for saturation. I have discovered that with such an arrangement the time required for substantial saturation is very much less than the time required for desaturation.

In accordance with another feature of my invention I secure a differential time delay by providing a circuit in which the time required for saturation of a reactor is substantially greater than the time required for desaturation. This may be done by utilizing a variable time constant saturating circuit in combination with a source of saturating current for producing no more than the minimum saturating current required for saturation.

An object of my invention is to provide a novel and useful differential time delay system.

Another object of my invention is to provide a novel differential time delay system having nonmechanical characteristics.

A further object of my invention is to provide a novel differential time delay system controlled by a saturable core reactor.

My invention will be better understood from the following description taken in connection with the accompanying drawing and its scope will be pointed out in the appended claims.

In the drawing, Figs. 1 and 2 are current wave forms reproduced from oscillograms for illustrating the principle of operation of my invention in securing a longer time for desaturation than for saturation of a reactor, Fig. 3 is a diagrammatic showing of an embodiment of my invention making use of the principle shown in Figs. 1 and 2 in such a way that the time delay in the deenergization of an electro-responsive device is much greater than the time delay in its energization, Fig. 4 is a diagrammatic showing of a modification in which the time delay for the energization of an electro-responsive device is much greater than for its deenergization and Fig. 5 is a further modification in which the time required for saturation of a reactor is much longer than the time required for its desaturation.

Referring now to the drawing and more particularly to Fig. 1, $I$ is a curve showing the variation in current in the alternating current winding of an ordinary saturable core reactor before, during, and after saturation, while curve $2$ represents a direct saturating current whose maximum, or steady state value is no more than sufficient to saturate the reactor. Between time $T_0$ and time $T_1$ there is no direct current in the saturating winding and the alternating current $I$ is relatively small due to the high reactance of the alternating current winding. At time $T_1$ direct potential is applied to the direct current saturating winding and as this current builds up to its final steady state value the core of the reactor is being saturated and consequently the alternating current is increasing. At $T_2$ the reactor is saturated and the direct current attains its steady state value. At time $T_3$ the direct potential is removed from the saturating winding and desaturation commences ending at about time $T_4$. It will be seen that the time required for saturation, represented by $T_s$, is substantially equal to the time $T_{ds}$ required for desaturation.

Fig. 2 shows how the time $T_s$ required for saturation becomes relatively insignificant while the time $T_{ds}$ required for desaturation remains about the same when the final or maximum direct saturating current is considerably greater than the minimum value necessary for saturation. As will be seen, curve 2 represents a direct saturating current which is almost twice as high as the corresponding current in Fig. 1.

In each case the time delays $T_s$ and $T_{ds}$ required for saturation and desaturation, respectively, are caused by the fact that the direct current produced saturating flux is linked by a closed electric damping circuit having a relatively high ratio of inductance to resistance or in other words, having a relatively large time constant.

In the embodiment of my invention shown in Fig. 3 an alternating current circuit 3 is energized by any suitable source of alternating current, such as an alternator 4. In this circuit is an alternating current electro-responsive device, which is illustrated by way of example as an alternating current relay or contactor 5. Connected for controlling the energization of the contactor 5 is a saturable core reactor 6. This reactor may be of any of the several well known types and is illustrated by way of example as a pair of similar transformers 7 and 8 having two corresponding windings connected in parallel in the alternating current circuit 3 and having the remaining two windings connected in series opposition in a direct current circuit including any suitable source of direct current such as a battery 9. A switch 10 is shown for controlling the flow of direct saturating current. Such a reactor has a number of advantages. The most important advantage from the standpoint of my invention is that by connecting the alternating current windings in parallel a closed loop circuit is formed. This loop circuit has a relatively low resistance and a relatively high inductance and consequently it has a relatively large time constant. It will be seen that this loop circuit is permanently closed and is independent of the closure of the external circuit 3 or the closure of the direct saturating current circuit. Another advantage of the arrangement is that by connecting the direct current windings in series opposition the alternating voltage induced in each of them by their associated alternating current windings cancel each other in the series direct current circuit so that no alternating current flows in the direct current circuit.

The potential of the direct current supply source 9 is sufficiently high that the steady state direct saturating current will be substantially in excess of the minimum required for saturation of the magnetic cores of the transformers 7 and 8 of the reactor 6. By saturation is meant a degree of flux in these cores corresponding at least to the so-called knee of the magnetization curve.

In operation, when the switch 10 is open, as shown in the drawing, the impedance of the alternating current windings of the reactor is so high that the contactor 5 is substantially deenergized and is deactuated. If now the switch 10 is closed the cores of the transformers 7 and 8 saturate rapidly in a time represented by $T_s$ of Fig. 2. This greatly decreases the reactance of the alternating current windings so that the alternating current through them increases as is shown in Figs. 1 and 2 by the curve 1. Consequently, the relay 5 becomes energized and is actuated so that, for example, it will quickly open its main contacts and close its back contacts. If now the switch 10 is suddenly opened the energy which is stored in the magnetic field produced by the direct saturating current will have to be dissipated as an $I^2R$ loss and most of it will be dissipated in the loop circuit comprising the alternating current windings of the reactor. This takes a considerable time as is shown by $T_{ds}$ in Fig. 2. Consequently, after the switch 10 is opened there is an appreciable time delay, which can be made of the order of several seconds, before the relay 5 is again substantially deenergized so that it can drop out and become deactuated.

Fig. 4 differs from Fig. 3 in that the alternating current windings of the reactor 6 are connected in parallel with the electro-responsive device 5 instead of in series therewith. In addition a ballast resistor 11 has been inserted in the circuit 3 in order to maintain substantially constant current flow therein. Such a ballast resistor is a well known device consisting usually of a relatively pure iron resistance element in an envelope containing an inert gas so as to prevent oxidation of the iron at high temperatures. The iron possesses the property of increasing its electrical resistance very rapidly with slight changes in current therethrough and in this way it acts substantially as a constant current device by inherently producing very large changes in resistance for very small changes in current.

The operation of the arrangement illustrated in Fig. 4 is the reverse of that shown in Fig. 3 in that when switch 10 is closed the reactor saturates rapidly whereby the alternating current windings, which then have a very low reactance, bypass substantially all of the current around the electro-responsive device so that it is quickly deenergized. Upon opening the switch 10 there is an appreciable time delay as explained above in the desaturation of the reactor so that there is a corresponding time delay in the energization of the electro-responsive device 5 because the energization of this device will obviously vary inversely with the reactance of the alternating current winding of the reactor.

In Fig. 5 the relative times for saturation and desaturation are reversed with respect to the corresponding times in the previous figures. The circuit comprises a modified type of saturable core reactor in the form of a three-legged core 12 having a direct saturating current winding 13 wound on the center leg and having an alternating current winding 14 wound on the outer portion of the core. With this construction the flux produced by the direct saturating winding 13 flows in opposite directions through the outer portions of the core thereby saturating the entire core while the alternating flux produced by the alternating current winding 14 circulates in the outer portion of the core and does not flow through the center leg so that no alternating voltage is induced in the direct current winding 13. The alternating current winding 14 is connected in series with the source of alternating current 4 for controlling the energization of a plurality of electro-responsive devices in the form of incandescent lamps 15. These lamps are substantially a pure resistance load so that the time constant of the circuit including the lamps and the alternating current winding 14 may be made relatively low due to the relatively large amount of resistance in this circuit.

The direct saturating current winding 13 is arranged to be energized by a suitable source of direct current such as a battery 16 which has a voltage sufficient to no more than produce minimum saturating current in the winding 13. The switch 10 is provided as in the other figures for controlling the connection of the battery 16 to the winding 13. Connected in parallel with the battery 16 and switch 10 is a relatively high resistance 17. The battery 16 has a relatively low resistance so that when the switch 10 is closed the time constant of the circuit including the battery 16 and the winding 13 is relatively high thus requiring a relatively long time for the transient current to build up to the final steady state minimum value required for saturation. When, however, the switch 10 is opened the low resistance battery 16 is removed from the circuit and the relatively high resistance 17 is inserted in series with the winding 13, thereby greatly decreasing the time constant of the direct current circuit and causing a rapid decay of the direct current in this circuit.

In the operation of Fig. 5 when the switch 10 is closed the reactor 12 saturates slowly due to the relatively high time constant of the circuit including the direct saturating current winding 13 and consequently the lamps 15 slowly increase in brilliancy due to the relatively slow decrease in the reactance of the alternating current winding 14 produced by the relatively slow saturation of the reactor. After a predetermined time the reactor will become fully saturated and the lamps will be energized at full brilliancy. If now the switch 10 is opened the time constant of the direct saturating current circuit is reduced to a value comparable to that of the alternating current circuit and consequently desaturation occurs rapidly and the lamps 15 are rapidly dimmed due to the rapid increase in the reactance of the alternating current winding 14.

While I have shown and described particular embodiments of my invention, it will be obvious to those skilled in the art that changes and modifications can be made therein and I, therefore, aim in the appended claims to cover all such changes and modifications as fall within the true spirit and scope of my invention.

What I claim as new and desire to secure by Letters Patent of the United States is:

1. In combination, a source of alternating current, an electro-responsive device connected to be energized thereby, a saturable core reactor connected to control the energization of said electro-responsive device by said source, a source of direct current, a switch, and means including a direct current saturating winding on said reactor arranged for energization by said source of direct current through said switch for changing the reactance of said reactor between relatively high and low values in substantially different time intervals upon the closing and opening respectively of said switch.

2. In combination, an electro-responsive device, an alternating current circuit for energizing said device, a saturable core reactor for controlling the energization of said electro-responsive device by said circuit, said reactor having a direct current saturating winding and a variable reactance alternating current winding, one of said windings being connected in an inductive circuit having a relatively large time constant, and means for selectively substantially instantaneously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturation of said reactor.

3. A differential time delay control system comprising, in combination, an electro-responsive device, an alternating current circuit for energizing said device, a saturable core reactor having a direct current saturating winding and a variable reactance alternating current winding, one of said windings being connected in an inductive circuit having a relatively large time constant, and means for selectively substantially instantaneously applying to and removing from said saturating winding a direct potential sufficiently high to produce a final steady state direct current in said saturating winding which exceeds the minimum requirements for saturation of said reactor by substantially two or more times.

4. In combination, an electro-responsive device, an alternating current circuit for energizing said device, a saturable core reactor for controlling the energization of said electro-responsive device by said circuit, said reactor having a direct current saturating winding and an alternating current winding in the form of a closed high ratio of inductance to reactance loop, and means for selectively substantially instantaneously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturation of said reactor.

5. A differential time delay control system comprising, in combination, an electro-responsive device, an alternating current circuit for energizing said device, a saturable core reactor having a direct current saturating winding and an alternating current winding in the form of a closed high ratio of inductance to reactance loop for controlling the degree of energization of said electro-responsive device by said circuit, and means for selectively substantially instantaneously applying to and removing from said saturating winding a direct potential sufficiently high to produce a final steady state direct current in said saturating winding which exceeds the minimum requirements for substantial saturation of said reactor by two or more times.

6. In combination, an electro-responsive device, an alternating current circuit for energizing said device, a saturable core reactor for controlling the energization of said electro-responsive device by said circuit in such a manner that when said reactor is substantially saturated said electro-responsive device has maximum energization and when said reactor is desaturated said electro-responsive device has minimum energization, said reactor having a direct current saturating winding and a variable reactance alternating current winding, one of said windings being connected in an inductive circuit having a relatively large time constant, and means for selectively substantially continuously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturation of said reactor.

7. In combination, an electro-responsive device, an alternating current circuit for energizing said device, a saturable core reactor for controlling the energization of said electro-responsive device by said circuit in such a manner that when said reactor is substantially saturated the electro-responsive device has maximum energization and when said reactor is desaturated said electro-responsive device has minimum energization, said reactor having a direct current saturating winding and an alternating current winding in the form of a closed high ratio of inductance to reactance loop, and means for selectively substantially continuously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturation of said reactor.

8. In combination, an electro-responsive device, an alternating current circuit for energizing said device, a saturable core reactor for controlling the energization of said electro-responsive device by said circuit in such a manner that when said reactor is substantially saturated the energization of said device will be a minimum and when said reactor is desaturated the energization of said device will be a maximum, said reactor having a direct current saturating winding and an alternating current winding in the form of a closed high ratio of inductance to reactance loop, and means for selectively substantially instantaneously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturating said reactor.

9. In combination, an electro-responsive device, an alternating current circuit for energizing said device, a saturable core reactor for controlling the energization of said electro-responsive device by said circuit in such a manner that when said reactor is substantially saturated the energization of said device will be a minimum and when said reactor is desaturated the energization of said device will be a maximum, said reactor having a direct current saturating winding and a variable reactance alternating current winding, one of said windings being connected in an inductive circuit having a relatively large time constant, and means for selectively substantially instantaneously applying to and removing from said saturating winding a direct potential sufficiently high to produce a final steady state direct current in said saturating winding which exceeds the minimum requirements for substantial saturation of said reactor by an amount sufficient to make the time required for substantial saturation of said reactor substantially less than the time required for desaturating said reactor.

10. In combination, a source of alternating current, an electro-responsive device, and a constant current device connected in series so as to be energized by said source of alternating current, a saturable core reactor having a direct current winding and having an alternating current winding connected in parallel with said electro-responsive device, and means for controlling the energization of said direct current winding.

11. In combination, a source of alternating current, an electro-responsive device and a constant current ballast resistor connected in series so as to be energized by said source of alternating current, a saturable core reactor having an alternating current winding connected in parallel with said electro-responsive device, and means for varying the saturation of said reactor.

CHAUNCEY G. SUITS.